US006785618B2

(12) United States Patent
Kechter et al.

(10) Patent No.: US 6,785,618 B2
(45) Date of Patent: Aug. 31, 2004

(54) IN-GROUND PIPELINE MONITORING

(75) Inventors: George E. Kechter, Marysville, OH (US); Vangal K. Narendran, Columbus, OH (US); Robert B. Francini, Columbus, OH (US); Brian N. Leis, Worthington, OH (US)

(73) Assignee: Gas Research Institute, Des Plaines, IL (US)

( * ) Notice: Subject to any disclaimer, the term of this patent is extended or adjusted under 35 U.S.C. 154(b) by 26 days.

(21) Appl. No.: 09/798,693

(22) Filed: Mar. 2, 2001

(65) Prior Publication Data

US 2002/0149488 A1 Oct. 17, 2002

(51) Int. Cl.[7] .............................................. G01B 5/28
(52) U.S. Cl. ......................................... 702/39; 702/51
(58) Field of Search ................. 73/40.5 A; 166/250.03; 364/509; 702/39, 51

(56) References Cited

U.S. PATENT DOCUMENTS

| 4,953,144 A | | 8/1990 | Chin et al. | |
|---|---|---|---|---|
| 5,416,724 A | * | 5/1995 | Savic | 702/51 |
| 5,544,074 A | * | 8/1996 | Suzuki et al. | 702/51 |
| 5,744,700 A | * | 4/1998 | Carme et al. | 73/40.5 A |
| 5,974,862 A | * | 11/1999 | Lander et al. | 73/40.5 A |
| 6,371,204 B1 | * | 4/2002 | Singh et al. | 166/250.03 |

FOREIGN PATENT DOCUMENTS

| EP | 0 444 200 | 9/1991 |
|---|---|---|
| EP | 0 552 044 | 7/1993 |
| FR | 2620720 | 3/1989 |
| WO | WO 87/07949 | 12/1987 |

OTHER PUBLICATIONS

R.B. Francini et al.: *Final Report, Real–Time Monitoring to Detect Third–Party Damage*, Gas Research Institute, Mar. 1996.
R.B. Francini et al.: *Final Report, Real–Time Monitoring to Detect Third–Party Damage: Phase II*, Gas Research Institute, Apr. 1997.

* cited by examiner

*Primary Examiner*—John Barlow
*Assistant Examiner*—Xiuqin Sun
(74) *Attorney, Agent, or Firm*—Mark E. Fejer

(57) ABSTRACT

A method for monitoring sound in an in-ground pipeline via at least first and second in-ground acoustic sensors wherein the first in-ground acoustic sensor is in contact with the in-ground pipeline and the second in-ground acoustic sensor is spaced from both the first in-ground acoustic sensor and the in-ground pipeline.

20 Claims, 3 Drawing Sheets

IN-GROUND PIPELINE MONITORING

BACKGROUND OF THE INVENTION

This invention relates generally to the monitoring of pipelines and, more particularly, to the monitoring of sound in an in-ground pipeline.

In-ground pipelines have found various uses. For example and without unnecessary limitation, in-ground pipelines are used extensively in the transmission of various materials between selected points or locations. Natural gas is one example of a material frequently transmitted via in-ground pipelines.

As will be appreciated, there is a common need or desired to be able to effectively monitor such below ground surface transmissions such as to avoid or otherwise preclude the occurrence of an accident or other improper conveyance of the material being transmitted through the pipeline. For example, there is a need and a demand for a monitoring method that permits the detection of the status of such a pipeline, such as the flow state of valves or other flow control elements included in the pipeline system, without undesirably interrupting or otherwise disrupting operation.

Further it is known that damage to in-ground pipelines can occur directly as a result of acts of nature such as earthquakes and landslides, for example. The damage resulting to in-ground pipelines as a result of the occurrence of such acts typically occurs on a sufficiently large scale such that multiple pipe joints are affected and detection of the occurrence of such damage is relatively easy. Pipeline damage can, however, occur due to the act of a third party, i.e., a party other than the owner or operator of the pipeline. Such damage is known as "third-party damage." When the damage due to an act of a third party causes an immediate rupture of a pipe, little can be done via on-line monitoring to prevent an ensuing incident. However, many third-party contacts with pipelines can cause damage that does not result in an immediate pipeline failure but rather can cause damage that may, with time, lead to a pipe failure such as in the form of a leak or a catastrophic rupture. For example, time and pressure cycling to which a pipeline might normally be subjected may, with time, eventually lead to the occurrence of such a pipeline failure, with such a pipeline failure sometimes referred to as a "delayed failure." In view of the above, the occurrence of such third-party contact and the effective detection thereof has proven to be a persistent problem.

While sounds associated with contact with a pipeline can be transmitted through the pipeline and detected at substantial distances from the point of contact via highly sensitive acoustic sensors, the high sensitivity of such sensors can produce or result in a significant number of false calls arising from sources other than by contact with the pipeline. For example, sources such as passing vehicles and weather conditions such as thunder and rain can produce or result in false calls to a normal sound detection and monitoring method and system.

In view of the consequences of the failure of an in-ground pipeline due to third-party contact, particularly when coupled with the extensive construction related with urban expansion and encroachment of the right-of-way commonly associated with many of such in-ground pipelines, there is a need and a demand for a method and system for monitoring in-ground pipelines and, in particular, detecting contact with a pipeline and proactively warn of the potential for the occurrence of damage associated therewith. In particular, there is a need and a demand for a reliable acoustic monitoring method and system that can effectively eliminate false calls such as may arise from at least certain noncontact events.

SUMMARY OF THE INVENTION

A general object of the invention is to provide an improved method and system for the monitoring of sound in an in-ground pipeline and the use thereof, such as for the detection of contact with such an in-ground pipeline.

A more specific objective of the invention is to overcome one or more of the problems described above.

The general object of the invention can be attained, at least in part, through a method for monitoring sound in an in-ground pipeline involving the processing of at least one first signal received from at least one first in-ground acoustic sensor and at least one second signal received from at least one associated second in-ground acoustic sensor, wherein the first in-ground acoustic sensor is in contact with the in-ground pipeline and the at least one associated second in-ground acoustic sensor is spaced from both the first in-ground acoustic sensor and the in-ground pipeline.

The prior art has generally failed to provide a method and system for the monitoring of sound in an in-ground pipeline in a manner that is as effective as may be desired. In particular, the prior art has generally failed to provide a method and system for the monitoring of an in-ground pipeline in a sufficiently unintrusive and effective manner such as to permit the detection of contact with the pipeline and proactively warn of the potential for the occurrence of damage associated with such contact while also minimizing or avoiding the occurrence of false signals such as may result from at least certain noncontact events with the pipeline of interest.

The invention further comprehends a method for detecting contact with a pipeline in the ground. In accordance with one embodiment of the invention, such method includes:

detecting an acoustic parameter associated with the pipeline and transmitting a corresponding first input signal to a processor;

detecting an acoustic parameter associated with the ground adjacent the pipeline and transmitting a corresponding second input signal to the processor; and comparing the first and second input signals in the processor in accordance with at least one signal comparison technique to produce a product signal as a function of the difference between the first and second input signal.

In accordance with another embodiment of the invention, a method for detecting contact with an in-ground pipeline includes:

receiving in a processor a first input signal from at least one first in-ground accelerometer and at least one second input signal from at least one associated second in-ground accelerometer, wherein the first in-ground accelerometer is in contact with an in-ground pipeline and the at least one associated second in-ground accelerometer is spaced from both the first in-ground sensor and the in-ground pipeline; and processing the first input signal and the at least one second input signal in the processor on at least one basis selected from the group consisting of time analysis, frequency analysis and a combination thereof to produce an output signal as a function of the difference between the first input signal and the second input signal.

Other objects and advantages will be apparent to those skilled in the art from the following detailed description taken in conjunction with the appended claims and drawings.

DETAILED DESCRIPTION OF THE INVENTION

The present invention provides an improved method and system for the monitoring sound in an in-ground pipeline and the use thereof, such as for the detection of contact, e.g., third-party contact, with such an in-ground pipeline. As detailed below, the sound monitoring method and system of the invention is particularly helpful and effective in minimizing or avoiding the occurrence of false signals such as may result from at least certain noncontact events with the pipeline of interest.

Figure 1:
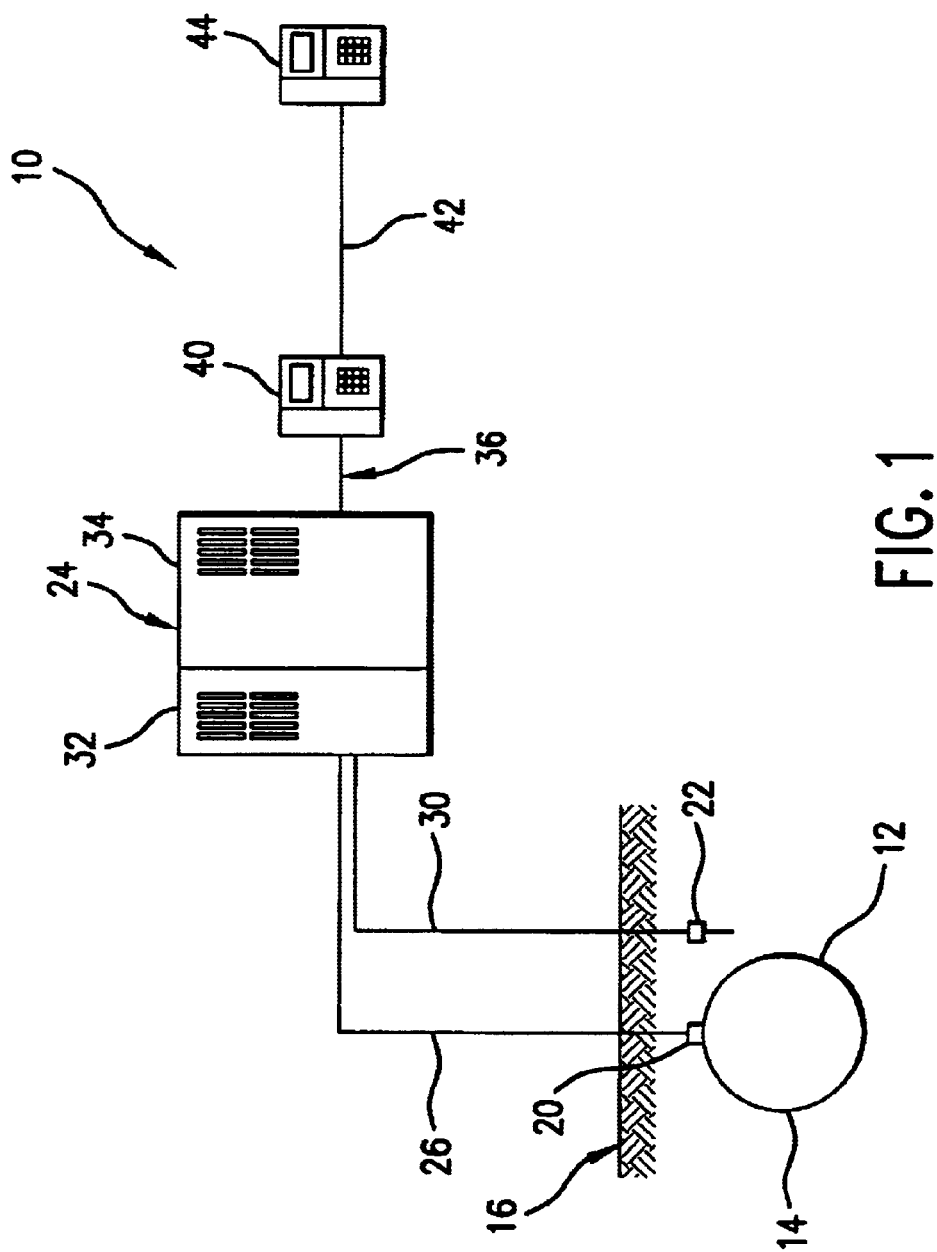
FIG. 1 a simplified schematic of a system for monitoring sound in an in-ground pipeline in accordance with one preferred embodiment of the invention.

The present invention may be embodied in a variety of structures and be practiced in a variety of manners. As representative, FIG. 1 illustrates the present invention as embodied in a system, generally designated by the reference numeral 10, for the monitoring of sound in an in-ground pipeline 12 in accordance with one preferred embodiment of the invention.

It will be understood that while the invention described hereinafter has general applicability to the monitoring of sound in various in-ground pipelines, the invention is believed to at least initially have particular utility in the detection of contact, such as by a third party for example, with a pipeline in the ground. Further, while the invention is generally applicable to such monitoring of in-ground pipelines, the invention is believed to at least initially have further particular utility for use in conjunction with those pipelines used for the transmission of a gaseous medium such as a natural gas stream, for example.

The pipeline 12 is in-ground, e.g., includes a portion 14 below the ground surface 16. As identified above, a common concern and persistent problem relative to in-ground pipelines is the occurrence of third-party contact with an in-ground pipeline. Of particular concern is the occurrence of such third-party contact that may go unreported and such as, though not resulting in an immediate pipeline failure, may with time, result in a failure such as in the form of a leak or rupture.

The system 10 is generally composed of a first acoustic sensor 20, a second acoustic sensor 22 and a signal conditioning and processing unit 24. As shown, the first acoustic sensor 20 is placed in-ground, e.g., under the ground surface 16, and is in contact with the in-ground pipeline 12. The second acoustic sensor 22 is also placed in-ground, e.g., under the ground surface 16. The second acoustic sensor 22 is desirably spaced from both the first in-ground acoustic sensor 20 and the in-ground pipeline 12. In accordance with a preferred practice of the invention and as detailed below, the inclusion and presence of at least one such second in-ground acoustic sensor, spaced from both the first in-ground acoustic sensor and the in-ground pipeline acoustic sensor can substantially reduce or eliminate the occurrence of false signals such as may result from at least certain noncontact events with the pipeline of interest.

As will be appreciated by those skilled in the art and guided by the teachings herein provided, various acoustic sensors such as capable of or useful in the detecting or monitoring of various or selected acoustic parameters such as relating to or resulting from pipeline vibrations are available and can, if desired, be used in the practice of the invention. For example, and without necessarily limiting the broader practice of the invention, acoustic sensors such as in the form of accelerometers, microphones or strain gauges can, if desired, be used. In view of the existence of substantial experience with the handling and use of accelerometers, the use of such devices may be preferred.

The acoustic sensors 20 and 22 are each in signal transmitting communication with the signal conditioning and processing unit 24 such as via the signal transmission lines 26 and 30, respectively. Alternatively, one or more of the acoustic sensors 20 and 22 can, if desired, be in wireless signal transmitting communication with the signal conditioning and processing unit 24, such as in a manner known to those skilled in the art and guided by the teachings herein provided. Thus, it is to be understood that the broader practice of the invention is not necessarily limited by the means or fashion of the signal transmission.

At the signal conditioning and processing unit 24, the signals from each of the acoustic sensors 20 and 22 are passed to a signal conditioner, represented by the reference numeral 32. In or as a result of the signal conditioner 24, the signals from each of the acoustic sensors 20 and 22 are converted into an appropriate voltage, current or other readable signal and, if further desired, amplified.

At the signal conditioning and processing unit 24, the conditioned signals from each of the acoustic sensors 20 and 22 can then be appropriately processed such as via one or more processing analysis or technique in a processor 34, such as in the manner described in greater detail below, to produce or form an appropriate corresponding warning signal or message. For example, in FIG. 1, the processor 34 produces a warning signal or message such as communicated via the line 36 to a phone 40. The phone 40 in turn is shown as in wireless communication (as represented by the dashed line 42) with a remotely located phone 44 where there is a capability to appropriately respond to the warning signal/message. As will be appreciated by those skilled in the art and guided by the teachings herein provided, other forms and means of signal communication can, if desired, be utilized and the broader practice of the invention is to be understood as not limited to particular or specific forms or means of signal communication.

As identified above, the signals from each of the acoustic sensors 20 and 22 can be appropriately processed such as via one or more processing analysis or technique in the processor 34 to produce or form an appropriate corresponding signal. For example and in accordance with one preferred embodiment of the invention, the signals are appropriately processed such as to produce or form a signal that indicates or corresponds to the pipeline having been subjected to a contact of sufficient predetermined intensity, as provided for by the selected processing analysis or techniques.

Those skilled in the art and guided by the teachings herein provided will appreciate that various processing analysis or techniques, either alone or in various selected combinations, can be used in the practice of the invention. For example and not necessarily limiting to the broader practice of the invention, such processing analysis or techniques may in accordance with one preferred embodiment of the invention involve processing of the signals from each of the acoustic sensors 20 and 22 on at least one basis selected from the group consisting of time analysis, frequency analysis and a combination thereof. Further, such processing analysis or techniques may in accordance with another preferred embodiment of the invention involve processing of the signals from each of the acoustic sensors 20 and 22 on at least two bases selected from the group consisting of time analysis, frequency analysis and a combination thereof. In yet another preferred embodiment of the invention, such processing analysis or techniques may involve processing of the signals from each of the acoustic sensors 20 and 22 based on time analysis, frequency analysis and a combination thereof. As will be appreciated, through the use of 2 or more of such basis of signal analysis the possibility of false signals can be further significantly reduced or eliminated.

While various forms or types of time or frequency analysis can be used in the practice of the invention, the invention will be further herein described with reference to the utilization of a "root-mean-square" ("RMS") form of such analysis of the time signal and/or a portion of the Power Spectral Density ("PSD"), such as based on known control analysis.

Time Domain RMS:

In this form of analysis, the equation representation (1) from below is used to differentiate between those sound signals that relate to the in-ground pipeline (such as by contact) and those sound signals that relate to the surrounding environment, e.g., ground in which the pipeline is buried.

$$\frac{\sqrt{\sum_{i=1}^{n} xoff_i^2}}{\sqrt{\sum_{i=1}^{n} xon_i^2}} \leq B \quad (1)$$

where, the signals from the sensor on the pipe and from the sensor spaced from the pipe each contain n points, $xon_i$, i=1 to n is the signal from the sensor on the pipe, $xoff_i$, i=1 to n is the signal from the sensor off the pipe, and B is a predetermined threshold value less than 1 (one).

In this form of analysis, when the inequality representation of equation (1) holds true, then the subject sound signals relate to the in-ground pipeline rather than to the surrounding environment, e.g., ground in which the pipeline is buried. Thus, in accordance with a preferred embodiment of the invention, such sound signals correlate or correspond to contact with the in-ground pipeline.

Frequency Domain RMS:

In this form of analysis, the sound signals from the sensor on the pipe and from the sensor spaced from the pipe are transformed using the Fast Fourier Transform (FFT) in the following manner:

$$Xon_k = \sum_{i=1}^{n} xon_i \cdot e^{-j2\pi \frac{k}{n}} \quad (2)$$

$$Xoff_k = \sum xoff_i \cdot e^{-j2\pi \frac{k}{n}} \quad (3)$$

where, k=1 to n, both $Xon_k$ and $Xoff_k$ are complex numbers, and each k of the transform is associated with a frequency.

The PSD of the signals is defined by:

$$XPon_k = \sqrt{Xon_k \cdot Xon_k^*} \quad (4)$$

$$XPoff_k = \sqrt{Xoff_k \cdot Xoff_k^*} \quad (5)$$

where, $Xon_k^*$ is the complex conjugate of $Xon_k$ and $Xoff_k^*$ is the complex conjugate of $Xoff_k$.

Only certain frequencies of interest are used from the PSD, herein referred to as the range 1=α to β, then the signal is determined to be a contact if the following is true:

$$\frac{\sqrt{\sum_{i=\alpha}^{\beta} XPoff_i^2}}{\sqrt{\sum_{i=\alpha}^{\beta} XPon_i^2}} \leq \Gamma \quad (6)$$

where Γ is a predetermined value less than 1 (one).

Time-frequency (Wavelet) Analysis:

In this form of analysis, the data obtained from the sensors using different time and frequency scales is used such as to produce or result in a 2×2 matrix of the amplitudes of the data.

An event like an impact to the pipeline can have a signature that has a unique pattern of values when viewed in this manner. The algorithm looks for this unique signature by comparing the values in the time-frequency values formed by the matrix with standard or established values such as found in a corresponding table. If the pattern of time-frequency values are similar, then the signal is designated as an impact.

Voting Scheme

If desired, in those methods in accordance with the invention wherein signals are processed on at least two bases selected from the group consisting of time analysis, frequency analysis and a combination thereof (e.g., time-frequency (wavelet) analysis), a weighted voting scheme can be applied thereto. For example, once analysis has determined using the above methods that a signal is in the pipeline or is not, it is given a value of 1 for a yes and 0 for no. Each of the analysis techniques is also given a weight determined by the overall confidence in the methods to be able to detect the signal of interest. The sum of the weights must add to one. Then the following equation can be used to determine if the signal is one that is in the pipeline:

$$\sum_{i=1}^{3} W_i \cdot Z_i \geq K \quad (7)$$

where,

K is a predetermined threshold, $W_i$ is the weighting for each scheme, $Z_i$ is the result of each of the analysis such that each $Z_i$ has a value of either 0 or 1, and i=1 to 3 and where, if the relationship (7) holds true, then the signal is in the pipeline and if the relationship (7) does not hold true, then the signal is not in the pipeline.

Figure 2:
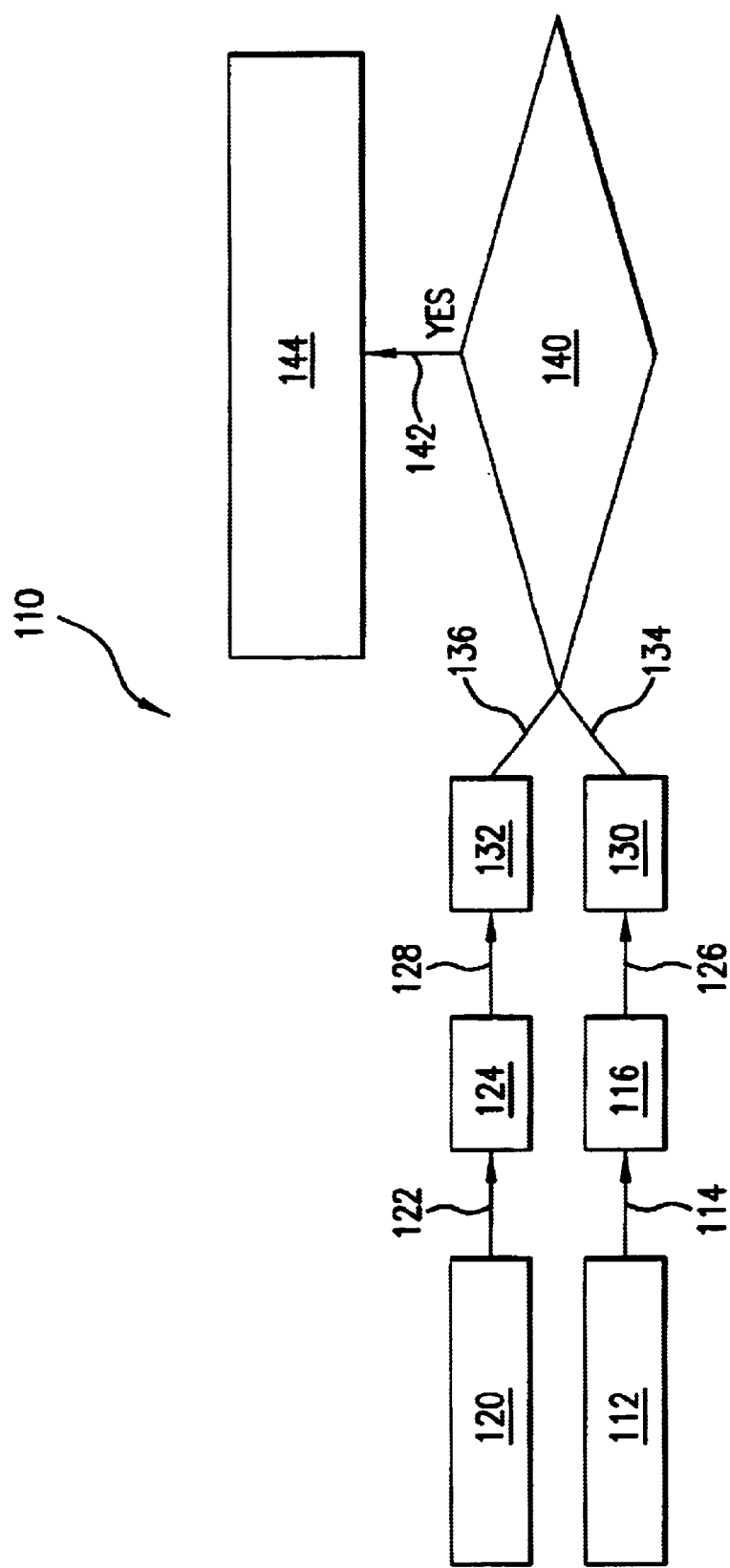
FIG. 2 is a simplified block diagram showing the monitoring of sound in an in-ground pipeline in accordance with one preferred embodiment of the invention.

Turning now to FIG. 2, there is illustrated a simplified block diagram processing schematic, generally designated 110, showing the monitoring of sound in an in-ground pipeline in accordance with one preferred embodiment of the invention. In accordance with the processing schematic 110, a signal 112 in the in-ground pipe is passed or received, represented by the line 114, to or by a first in-ground acoustic sensor 116 which is in contact with the pipe. Similarly, a signal 120 in the ground adjacent the pipe of interest is passed or received, represented by the line 122, to or by a second in-ground acoustic sensor 124 which, in accordance with a preferred embodiment of the invention is spaced from both the first in-ground acoustic sensor and the in-ground pipeline.

A signal from each of the sensors 116 and 124, represented by the lines 126 and 128, respectively, can then, if desired and as shown, be forwarded or advanced to appropriate signal conditioners, as identified above, and here designated by the reference numeral 130 and 132, respectively. The signal conditioners 130 and 132 each then forward an appropriately conditioned signal 134 and 136, respectively to signal analysis 140, such as described above and such as in a processor.

If the warning conditions of the signal processing analysis are satisfied, then a warning is issued or other appropriate signal sent, as represented by the line 142, such at to the control box 144.

Figure 3:
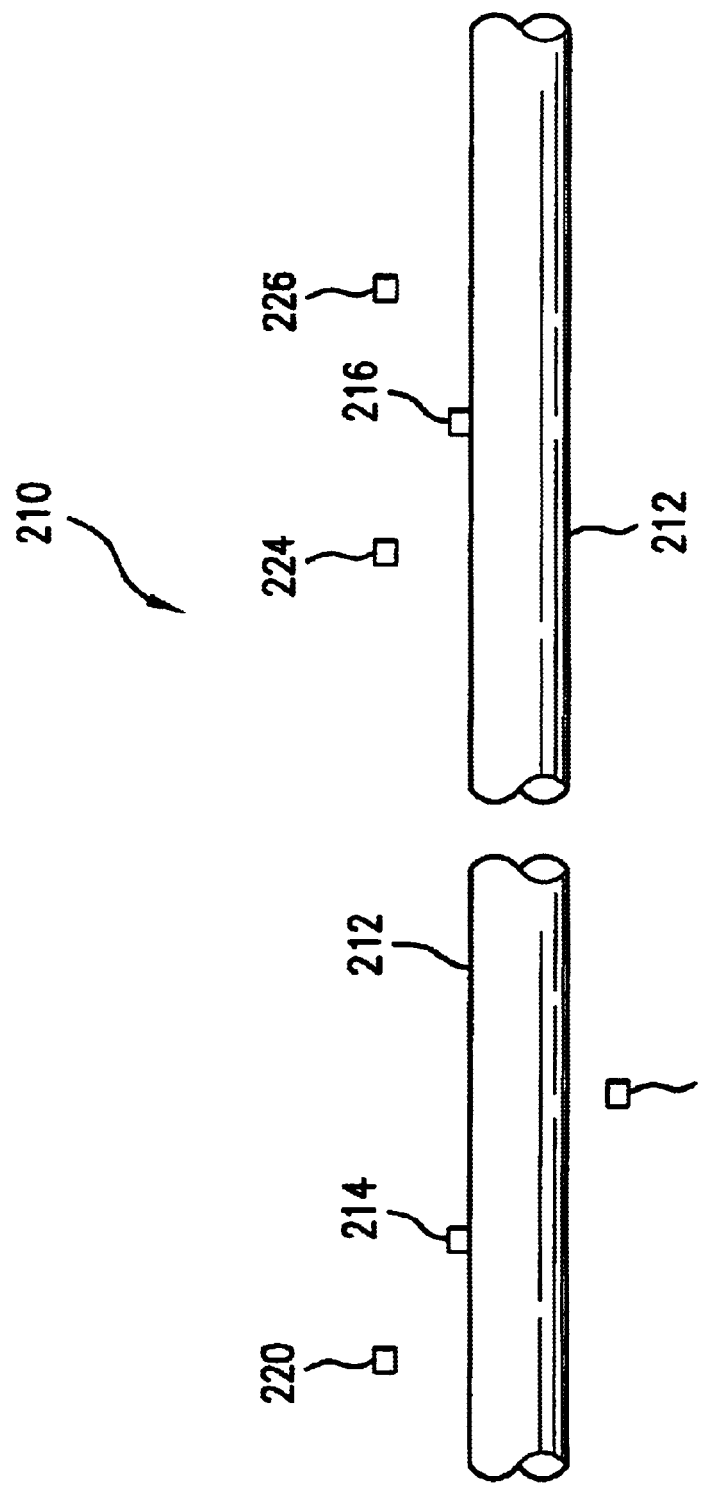
FIG. 3 a simplified fragmentary schematic of an in-ground pipeline with multiple acoustic sensors in accordance with one preferred embodiment of the invention.

While the invention has been described above making specific reference to a system and method having one first in-ground acoustic sensor in contact with the in-ground pipeline and one associated second in-ground acoustic sensor spaced from both the first in-ground acoustic sensor and the in-ground pipeline, the broader practice of the invention is not necessarily so limited. For example, turning to FIG. 3 there is illustrated a system fragmentary portion, designated by the reference numeral 210, of an in-ground pipeline 212. The fragmentary portion 210 includes two first in-ground acoustic sensors 214 and 216, each in contact with the in-ground pipeline 212. Two second in-ground acoustic sensors 220 and 222, respectively, are associated with the first in-ground acoustic sensor 214 and are each spaced from both the first in-ground acoustic sensor 214 and the in-ground pipeline 212. Similarly, two second in-ground acoustic sensors 224 and 226, respectively, are associated with the first in-ground acoustic sensor 216 and are each spaced from both the first in-ground acoustic sensor 216 and the in-ground pipeline 212.

Those skilled in the art and guided by the teachings herein provided will appreciate that through the inclusion of multiple first in-ground acoustic sensors in contact with the in-ground pipeline having at least one associated second in-ground acoustic sensor spaced from both the respective first in-ground acoustic sensor and the in-ground pipeline, the effective monitoring of extended lengths of pipeline, such as in a continuous fashion, can be facilitated. In addition, while the inclusion of multiple associated second in-ground acoustic sensors for a first sensor in contact with the pipeline can be helpful in reducing the likelihood of a false signal, it will be appreciated that associated factors such as relating to cost and increased control complexity may in practice favor the use or employment of a single associated second sensor, spaced from both the first in-ground acoustic sensor and the in-ground pipeline, for a respective first in-ground acoustic sensor in contact with the in-ground pipeline.

While the invention has been described above as having particular utility in conjunction with the monitoring of in-ground pipelines such convey or transmit a gaseous medium such as a natural gas stream, it will be understood by those skilled in the art and guided by the teachings herein provided that the broader practice of the invention is not necessarily so limited. For example, if desired, the invention can be practiced in conjunction with a pipeline which conveys or transmits a material such as having a different selected fluid form such as a liquid, for example.

Further, while the invention has been described above making specific reference to the detection of contact, e.g., such as by a third party, with an in-ground pipeline, it will be understood that the broader practice of the invention is not necessarily so limited. In particular, and without unnecessarily limiting the practice of the invention, either or both the method and system of the invention can be applied to the detection of other kinds or types of sounds such as may be transmitted through an in-ground pipeline and such as may be desired or found useful in the monitoring of such in-ground pipelines. For example, the sound monitoring and detection method and system of the invention can, if desired, be applied to monitoring or detecting the state (e.g., open or closed condition) of a valve or other flow control element within the pipeline.

Thus, the invention provides a method and system for the monitoring of sound in an in-ground pipeline in a more effective manner than otherwise previously known or disclosed. In particular, the invention provides a method and system for the monitoring of an in-ground pipeline such as to permit the detection of contact with the pipeline and proactively warn of the potential for the occurrence of damage associated with such contact, which method and system can operate in a manner which is both more unintrusive and effective than previously available.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In a method for monitoring sound in an in-ground pipeline, the improvement comprising:
   processing at least one first signal received from at least one first in-ground acoustic sensor and at least one second signal received from at least one associated second in-ground acoustic sensor, wherein the first in-ground acoustic sensor is in contact with the in-ground pipeline and the at least one associated second in-ground acoustic sensor is spaced from both the first in-ground acoustic sensor and the in-ground pipeline.

2. The method of claim 1 wherein the at least one first signal results from contact with the in-ground pipeline.

3. The method of claim 1 wherein the at least one first in-ground acoustic sensor is an accelerometer.

4. The method of claim 1 wherein the at least one associated second in-ground acoustic sensor is an accelerometer.

5. The method of claim 1 wherein at least one second signal is received from each of a plurality of associated second in-ground acoustic sensors, wherein each of the plurality of associated second in-ground acoustic sensors is spaced from the at least one first in-ground acoustic sensor, the in-ground pipeline and from each other.

6. The method of claim 1 wherein the at least one first signal and the at least one second signal are processed on at least one basis selected from the group consisting of time analysis, frequency analysis and a combination thereof.

7. The method of claim 6 wherein the at least one first signal and the at least one second signal are processed on at least two bases selected from the group consisting of time analysis, frequency analysis and a combination thereof.

8. The method of claim 7 wherein the at least one first signal and the at least one second signal are processed based on time analysis, frequency analysis and a combination thereof.

9. The method of claim 1 providing a continuous monitoring of the in-ground pipeline.

10. The method of claim 1 wherein the in-ground pipeline transmits a gaseous medium.

11. The method of claim 10 wherein the in-ground pipeline transmits a natural gas stream.

12. The method of claim 1 comprising the processing of at least one first signal received from at least one of a plurality of the first in-ground acoustic sensors and at least one second signal received from at least one second in-ground acoustic sensor associated with the at least one of a plurality of the first in-ground acoustic sensors from which the at least one first signal is received.

13. A method for detecting contact with a pipeline in the ground, the method comprising:

detecting an acoustic parameter associated with the pipeline using a first in-ground acoustic sensor in contact with the pipeline and transmitting a corresponding first input signal to a processor;

detecting an acoustic parameter associated with the ground adjacent the pipeline using a second in-ground acoustic sensor spaced from both the pipeline and the first in-ground acoustic sensor and transmitting a corresponding second input signal to the processor; and comparing the first and second input signals in the processor in accordance with at least one signal comparison technique to produce a product signal as a function of the difference between the first and second input signal.

14. A The method of claim 13 wherein at least one of the first in-ground acoustic sensor and the second in-ground acoustic sensor is an accelerometer.

15. The method of claim 13 wherein the first and second input signals are compared on at least one basis selected from the group consisting of time analysis, frequency analysis and a combination thereof.

16. The method of claim 15 wherein the first and second input signals are compared on at least two bases selected from the group consisting of time analysis, frequency analysis and a combination thereof.

17. The method of claim 16 wherein the first and the second input signals are compared based on time analysis, frequency analysis and a combination thereof.

18. A method for detecting contact with an in-ground pipeline, the method comprising:

receiving in a processor a first input signal from at least one first in-ground accelerometer and at least one second input signal from at least one associated second in-ground accelerometer, wherein the first in-ground accelerometer is in contact with an in-ground pipeline and the at least one associated second in-ground accelerometer is spaced from both the first in-ground sensor and the in-ground pipeline; and processing the first input signal and the at least one second input signal in the processor on at least one basis selected from the group consisting of time analysis, frequency analysis and a combination thereof to produce an output signal as a function of the difference between the first input signal and the second input signal.

19. The method of claim 18 wherein the first input signal and the at least one second input signal are compared on at least two bases selected from the group consisting of time analysis, frequency analysis and a combination thereof.

20. The method of claim 19 wherein the first input signal and the at least one second input signal are compared based on time analysis, frequency analysis and a combination thereof.

* * * * *